US012627588B2

(12) United States Patent
Zhou et al.

(10) Patent No.: US 12,627,588 B2
(45) Date of Patent: May 12, 2026

(54) METHOD FOR COMMUNICATION IN DATA CENTER, APPARATUS, AND SYSTEM

(71) Applicant: HUAWEI TECHNOLOGIES CO., LTD., Shenzhen (CN)

(72) Inventors: Yigang Zhou, Shanghai (CN); Shengwen Lu, Hangzhou (CN); Xiubin Mao, Hangzhou (CN); Zhonghua Hu, Shenzhen (CN); Fengkai Li, Beijing (CN); Yongfeng Liu, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 618 days.

(21) Appl. No.: 18/170,293

(22) Filed: Feb. 16, 2023

(65) Prior Publication Data

US 2023/0198896 A1 Jun. 22, 2023

Related U.S. Application Data

(63) Continuation of application No. PCT/CN2021/103256, filed on Jun. 29, 2021.

(30) Foreign Application Priority Data

Aug. 17, 2020 (CN) .......................... 202010826601.3
Dec. 31, 2020 (CN) .......................... 202011639115.7

(51) Int. Cl.
*H04L 45/02* (2022.01)
*H04B 10/27* (2013.01)
(Continued)

(52) U.S. Cl.
CPC ........... *H04L 45/02* (2013.01); *H04B 10/271* (2013.01); *H04L 41/0894* (2022.05);
(Continued)

(58) Field of Classification Search
CPC . H04L 45/655; H04L 41/0894; H04L 45/245; H04L 45/38; H04B 10/271
(Continued)

(56) References Cited

U.S. PATENT DOCUMENTS 7,065,493 B1 * 6/2006 Homsi ............. G06Q 10/06316
705/7.26
10,742,682 B2 * 8/2020 Yu ........................... H04L 69/22
(Continued)

FOREIGN PATENT DOCUMENTS

CN 103441942 A 12/2013
CN 107196878 A 9/2017
(Continued)

OTHER PUBLICATIONS

Ruan et al.U.S. Appl. No. 62/566,060 specification, Sep. 29, 2017, ALL (Year: 2017).*
(Continued)

*Primary Examiner* — Anthony Mejia
(74) *Attorney, Agent, or Firm* — Fish & Richardson P.C.

(57) ABSTRACT

One example method includes receiving network topology information delivered by a topology manager, where the data center includes a plurality of servers, a plurality of electrical switches, and at least one optical cross-connect device. A data flow can be obtained. A routing policy can be configured for the data flow based on the network topology information, where the routing policy includes any one or a combination of the following routing policies: a first routing policy, where the first routing policy indicates to forward the data flow through an optical channel in the at least one optical cross-connect device; a second routing policy, where the second routing policy indicates to split the data flow into at least two sub-data flows for forwarding; or a third routing policy, where the third routing policy indicates to forward
(Continued)

the data flow through an electrical switch of the plurality of electrical switches.

20 Claims, 6 Drawing Sheets

(51) Int. Cl.

| | | |
|---|---|---|
| *H04L 41/0894* | (2022.01) | |
| *H04L 45/00* | (2022.01) | |
| *H04L 45/24* | (2022.01) | |
| *H04L 45/655* | (2022.01) | |

(52) U.S. Cl.
CPC ............ *H04L 45/245* (2013.01); *H04L 45/38* (2013.01); *H04L 45/655* (2022.05)

(58) Field of Classification Search
USPC ........................................................ 370/392
See application file for complete search history.

(56) References Cited

U.S. PATENT DOCUMENTS

| | | | | |
|---|---|---|---|---|
| 10,764,189 | B1 * | 9/2020 | Rivaud | ................... H04L 45/70 |
| 10,778,533 | B2 * | 9/2020 | Goldfarb | ................ H04L 67/30 |
| 2012/0188949 | A1 * | 7/2012 | Salkintzis | ............ H04W 40/02 |
| | | | | 370/329 |
| 2013/0223226 | A1 * | 8/2013 | Narayanan | .............. H04L 45/64 |
| | | | | 370/236 |
| 2015/0160831 | A1 * | 6/2015 | Nor | .................... G06F 11/3438 |
| | | | | 715/748 |
| 2016/0105343 | A1 * | 4/2016 | Janarthanan | ............ H04L 43/50 |
| | | | | 370/252 |
| 2016/0191392 | A1 * | 6/2016 | Liu | ....................... H04L 47/125 |
| | | | | 370/235 |
| 2017/0331740 | A1 * | 11/2017 | Levy | ...................... H04L 49/25 |
| 2018/0026895 | A1 * | 1/2018 | Wang | ..................... H04L 47/20 |
| | | | | 370/235 |
| 2018/0123948 | A1 * | 5/2018 | Lin | ....................... H04L 67/141 |
| 2019/0386924 | A1 * | 12/2019 | Srinivasan | ............ H04L 47/122 |
| 2020/0014486 | A1 * | 1/2020 | Harrang | .................. H04L 67/06 |
| 2020/0177545 | A1 * | 6/2020 | Shih | ...................... H04L 63/029 |
| 2020/0204479 | A1 * | 6/2020 | Filsfils | ................... H04L 45/74 |
| 2021/0320820 | A1 * | 10/2021 | Ruan | .................. H04L 43/0876 |
| 2023/0115762 | A1 * | 4/2023 | Ameling | ................. H04L 45/20 |
| | | | | 370/252 |
| 2023/0362095 | A1 * | 11/2023 | Tian | ................... H04L 43/0882 |

FOREIGN PATENT DOCUMENTS

| | | | | | |
|---|---|---|---|---|---|
| CN | 105871718 | B | * | 8/2019 | .......... H04L 45/745 |
| EP | 3125472 | A1 | * | 2/2017 | ............ H04L 45/64 |
| EP | 4184937 | A1 | * | 5/2023 | ............ H04L 45/02 |
| EP | 4184937 | B1 | * | 10/2025 | .......... H04L 45/655 |
| TW | 201728124 | A | * | 8/2017 | ........ H04L 12/4641 |
| WO | WO-2010091640 | A1 | * | 8/2010 | ......... H04L 67/1001 |
| WO | WO-2015047302 | A1 | * | 4/2015 | .......... G06F 16/254 |
| WO | WO-2020224604 | A1 | * | 11/2020 | ........ H04L 41/0894 |

OTHER PUBLICATIONS

Ruan et al. U.S. Appl. No. 62/566,060 drawings, Sep. 29, 2017, ALL (Year: 2017).*

Chao et al., "Flow Classification for Software-Defined Data Centers Using Stream Mining" IEEE Transactions on services computing, vol. 12. No.1, Jan./Feb. 2019, ALL (Year: 2019).*

Kong et al., "Numerical and experimental study of a cascaded microelectromechanical system-based all-optical data center interconnect," Optical Engineering, Jul. 1, 2016, 55(7):076111.

Cui et al., "SD-HDC: Software-Defined Hybrid Optical/Electrical Data Center Architecture," Proceedings of Global Communications Conference, Dec. 4, 2017, pp. 1-6.

Extended European Search Report in European Appln No. 21857362. 4, dated Jan. 3, 2024, 34 pages.

International Search Report and Written Opinion in International Appln. No. PCT/CN2021/103256, mailed on Sep. 28, 2021, 17 pages (with English translation).

* cited by examiner

1

METHOD FOR COMMUNICATION IN DATA CENTER, APPARATUS, AND SYSTEM

CROSS-REFERENCE TO RELATED APPLICATIONS

This application is a continuation of International Application No. PCT/CN2021/103256, filed on Jun. 29, 2021, which claims priority to Chinese Patent Application No. 202010826601.3, filed on Aug. 17, 2020, and claims priority to Chinese Patent Application No. 202011639115.7, filed on Dec. 31, 2020. All of the aforementioned patent applications are hereby incorporated by reference in their entireties.

TECHNICAL FIELD

The present invention generally relates to the communication technologies, and in particular, to a method for communication in a data center, an apparatus, and a system.

BACKGROUND

In a conventional data center network using electrical switches, fat-tree (Fat-tree) networking is usually used. End side servers are connected to top of rack (Top of Rack, ToR) switches through electrical cables or optical cables (optical-electrical signal conversion needs to be performed). The ToR switches are interconnected to Leaf, Spine, and Core switches based on a specific oversubscription ratio to form a data center network (Data Center Network, DCN) with a maximum of millions of nodes.

A switch in the conventional DCN network processes a network packet carried by an electrical signal, supports packet-level switching and routing, and also supports advanced functions such as packet buffering and traffic congestion control on the switch. In the conventional DCN network, transmission is performed on a communication link based on an optical signal, and a switching node needs to perform packet switching based on an electrical signal. Therefore, for per-hop to the switch on a transmission path, an optical signal needs to be converted into an electrical signal and then to an optical signal. This causes problems in the DCN network, such as high energy consumption, high construction costs, a long E2E packet transmission delay, and constraints on a switch port bandwidth by an electrical signal processing capability.

SUMMARY

Embodiments of this application provide a method for communication in a data center, an apparatus, and a system, to improve communication efficiency of a data center or reduce energy consumption and costs of the data center.

According to a first aspect, this application provides a method for communication in a data center. The data center includes a plurality of servers, a plurality of electrical switches, and at least one optical cross-connect device, and uplink ports of at least two of the plurality of electrical switches are interconnected to the at least one optical cross-connect device. The method includes: receiving network topology information delivered by a network topology manager; obtaining a data flow; and configuring a routing policy for the data flow based on the network topology information, where the configured routing policy may include a first routing policy indicating that the data flow is forwarded through an optical channel in the at least one optical cross-connect device, or may include a second routing policy indicating that the data flow is split into at least two sub-data flows for forwarding, or may include a third routing policy indicating that the data flow is forwarded through the electrical switch in the data center, or may include a first combination policy of using the third routing policy for a first packet portion of the data flow and using the first routing policy for a second packet portion of the data flow, or may include a second combination policy of using the third routing policy for a first packet portion of the data flow and using the second routing policy for a second packet portion of the data flow.

Preferably, the method is performed by at least one of the plurality of servers, or the method is performed by each of the plurality of servers.

Preferably, the method is performed by a network interface card in the server, for example, a smart network interface card having a network processor.

In this embodiment of the present invention, a hybrid DCN of a conventional packet switching device (for example, the electrical switch) and an optical cross-connect device is used for networking. A source routing technology on the server is used to implement routing of the data flow in the data center, and centralized route calculation is distributed to the smart network interface card in the server for independent calculation. This avoids problems of difficulty in controller fault tolerance caused by the centralized route calculation on an SDN controller, and rerouting and slow routing convergence after a network failure.

Optionally, when a first packet of the data flow is received, the third routing policy is configured for the data flow based on address information carried in the data flow and the network topology information.

Optionally, a type of the data flow is identified based on packets of the data flow, and an updated routing policy is configured for the data flow based on the type of the data flow, where the updated routing policy includes the first routing policy or the second routing policy.

Optionally, the first routing policy is configured for a data flow of a first type, and the second routing policy is configured for a data flow of a second type.

In this embodiment of the present invention, classified data flows are scheduled to the electrical switch or the optical cross-connect device for forwarding, so as to flexibly use advantages of electrical switching and optical cross-connect. Therefore, network construction costs of the DCN network are reduced, and an impact of a large data flow such as an elephant flow on network congestion and network fairness is greatly reduced. An elephant flow of a first type is directly forwarded through an optical channel to reduce a large amount of optical-electrical conversion caused by forwarding of such heavy traffic using an electrical switch. Therefore, forwarding efficiency of the elephant flow of the first type may be improved and energy consumption of the data center may be reduced. In addition, in a time period when the elephant flow of the first type occurs, an impact of the elephant flow of the first type on other traffic in the data center may also be reduced. For another example, a split forwarding mode is used for a second regular elephant flow, so that forwarding efficiency of this type of elephant flow may be improved.

Optionally, the method further includes: selecting a target optical cross-connect device from the at least one optical cross-connect device, and indicating the target optical cross-connect device to establish the optical channel. On a conventional OxC device, the optical channel is manually and statically configured, and may not be flexibly configured based on a dynamic change of the data flow. In this embodiment of the present invention, a server identifies the type or change of the data flow, and drives an optical channel controller to dynamically configure the optical cross-connect device to dynamically establish the optical channel. The elephant flow of the first type may be scheduled to the optical channel of the OxC device as required, thereby reducing the impact of the elephant flow of the first type on other traffic in the network.

Optionally, the method further includes: obtaining first sub-routing information, where the first sub-routing information includes information on routing the data flow of the first type to the target optical cross-connect device; and forwarding subsequent packets of the data flow of the first type to the target optical cross-connect device based on the first sub-routing information.

Optionally, the method further includes: obtaining routing information of at least two equal-cost sub-paths based on the third routing policy.

Optionally, the method further includes: splitting subsequent packets of the data flow of the second type into at least two sub-data flows, and forwarding the two sub-data flows based on the routing information of the two equal-cost paths. For the regular elephant flow, a splitting mode may be used for forwarding the packets in a distributed mode. This improves load balancing between the paths in the network and improves the communication efficiency.

Optionally, the data flow of the first type is a tidal elephant flow, and the data flow of the second type is a regular elephant flow.

Optionally, feature information carried in the packets of the data flow is identified; and if the feature information of the packets matches preset information, it is determined that the data flow is the data flow of the first type; or a quantity of packets of the data flow in a first time period, or an amount of data included in packets in a first time period, or a bandwidth required by packets in a first time period is identified; and if the quantity of packets, the amount of data, or the required bandwidth in the first time period is greater than a preset threshold, it is determined that the data flow is the data flow of the second type.

Optionally, network connection information of a neighboring switch is obtained by using a link layer discovery protocol, and the obtained network connection information is reported to the topology manager. A link layer discovery protocol agent is deployed and run on the server (for example, the smart network interface card) to add the server to the network. Routes are distributed and calculated at a source end to share the load of the switches on the network.

According to a second aspect, this application provides a data center. The data center includes a plurality of servers, a plurality of electrical switches, and at least one optical cross-connect device, and uplink ports of at least two of the plurality of electrical switches are interconnected to the at least one optical cross-connect device. At least one of the plurality of servers is configured to: receive network topology information; obtain a data flow; and configure a routing policy for the data flow based on the network topology information, where the routing policy includes any one or a combination of the following routing policies: a first routing policy, where the first routing policy indicates to forward the data flow through an optical channel in the at least one optical cross-connect device; a second routing policy, where the second routing policy indicates to split the data flow into at least two sub-data flows for forwarding; and a third routing policy, where the third routing policy indicates to forward the data flow through the electrical switch in the data center.

Optionally, the plurality of servers and the plurality of electrical switches form a plurality of service clusters, where a first service cluster includes at least two servers, at least two access switches, and at least one aggregation switch, first uplink ports of the at least two access switches are interconnected to the at least one optical cross-connect device, and second uplink ports of the at least two access switches are interconnected to the at least one aggregation switch.

Optionally, the plurality of servers and the plurality of electrical switches form a plurality of service clusters, where a first service cluster includes at least two access switches and at least one aggregation switch, a first uplink port of the at least one aggregation switch is interconnected to the at least one optical cross-connect device, and a second uplink port of the at least one aggregation switch is interconnected to a backbone switch.

Optionally, the plurality of servers and the plurality of electrical switches form a plurality of service clusters, where a first service cluster includes at least two servers, at least two access switches, and at least one aggregation switch, first uplink ports of the at least two access switches are interconnected to a first optical cross-connect device in the at least one optical cross-connect device, second uplink ports of the at least two access switches are interconnected to the at least one aggregation switch, a first uplink port of the at least one aggregation switch is interconnected to a second optical cross-connect device in the at least one optical cross-connect device, and a second uplink port of the at least one aggregation switch is interconnected to a backbone switch.

Optionally, the data center further includes a topology manager, and the topology manager is configured to: obtain network connection information sent by each device in the data center; obtain network topology information based on the network connection information of the device; and deliver the network topology information to the at least one of the plurality of servers.

Optionally, the at least one server includes a network interface card, the network interface card obtains network topology information delivered by the topology manager, and the network interface card configures the routing policy based on the network topology information.

According to a third aspect, this application provides a server. The server includes a processing unit configured to perform any method according to the first aspect.

According to a fourth aspect, this application provides a network interface card. The network interface card includes a network processor, and the network processor is configured to perform any method according to the first aspect.

According to a fifth aspect, this application provides a server or a network interface card. The server includes a processor and a memory. The memory is configured to store program code, and the processor is configured to execute the program code to implement any method according to the first aspect.

According to a sixth aspect, this application provides a routing processing apparatus, used in the data center according to the second aspect. The routing processing apparatus includes a source routing controller. The source routing controller is configured to receive: network topology information delivered by a network topology manager, obtain a data flow, and configure a routing policy for the data flow based on the network topology information. The configured routing policy may include a first routing policy indicating that the data flow is forwarded through an optical channel in at least one optical cross-connect device, or may include a second routing policy indicating that the data flow is split into at least two sub-data flows for forwarding, or may include a third routing policy indicating that the data flow is forwarded through the electrical switch in the data center, or may include a first combination policy of using the third routing policy for a first packet portion of the data flow and using the first routing policy for a second packet portion of the data flow, or may include a second combination policy of using the third routing policy for a first packet portion of the data flow and using the second routing policy for a second packet portion of the data flow.

Optionally, the routing processing apparatus is a smart network interface card in the server.

Optionally, the source routing controller includes a source routing engine and an optical cross-connect control engine. The source routing engine is configured to calculate the routing policy based on the network topology information. The optical cross-connect control engine is configured to control, when the optical channel needs to be established, the optical cross-connect device to establish the optical channel.

Optionally, the routing processing apparatus further includes an identification engine. The identification engine is configured to: identify a type of a data flow, report different types of data flows to the source routing engine, and obtain a routing policy provided by the source routing engine.

According to a seventh aspect, this application provides a computer-readable storage medium or a computer program product. The computer-readable storage medium stores instructions. When the instructions are run by a processor, the communication method provided in any implementation of the second aspect is implemented. The computer-readable storage medium includes but is not limited to a read-only memory, a random access memory, a flash memory, an HDD, or an SSD.

In embodiment of the present invention, the hybrid DCN of the conventional packet switching device (for example, the electrical switch) and the optical cross-connect device is used for networking. The source routing technology on the server is used to implement routing of the data flow in the data center, and the centralized route calculation is distributed to the smart network interface card in the server for independent calculation. This avoids problems of difficulty in controller fault tolerance caused by the centralized route calculation on an SDN controller, and rerouting and slow routing convergence after a network failure.

Embodiments of the present invention break through a networking architecture of a conventional data center, and provide a novel data center networking architecture of hybrid optical-electrical routing. In a data center network architecture, an optical cross-connect device is provided to interconnect with a base switch or an edge switch, and an optical channel is used for forwarding a related data flow. This improves network transmission efficiency.

BRIEF DESCRIPTION OF DRAWINGS

To describe technical solutions in embodiments of this application or in the background more clearly, the following describes the accompanying drawings used in embodiments of this application or in the background.

DESCRIPTION OF EMBODIMENTS

The following describes embodiments of this application with reference to the accompanying drawings in embodiments of this application.

Figure 1:
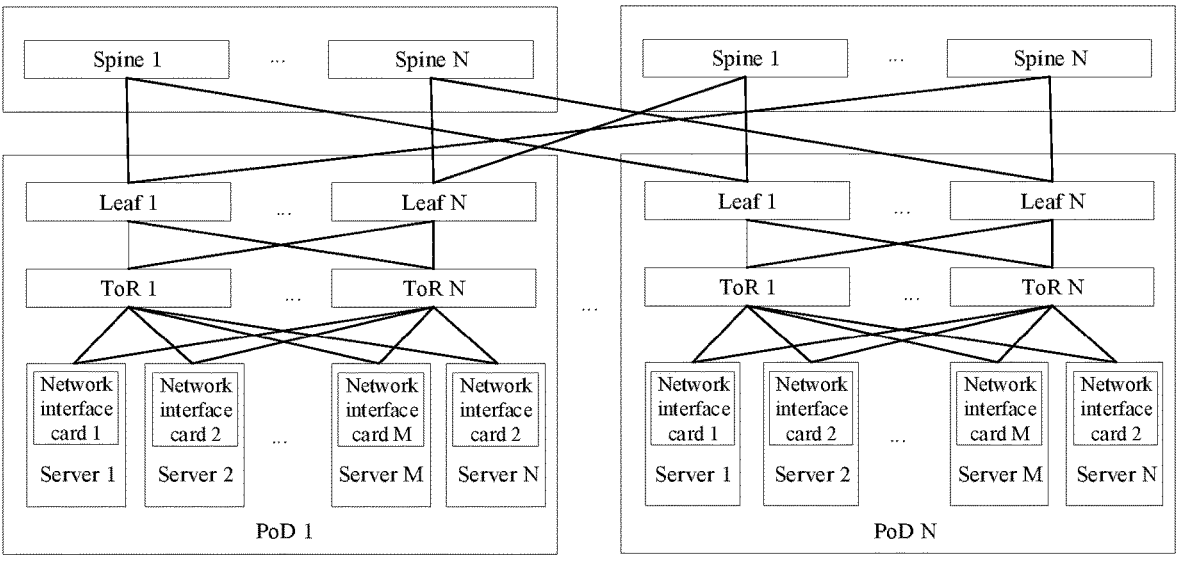
FIG. 1 is a diagram of a conventional data center network architecture.

As shown in FIG. 1, a fat-tree structure is used in most conventional data centers. A structure of a network is a three-layer tree structure. The network is split into a core layer, an aggregation layer, and an edge access layer. A plurality of servers are loaded in each rack, and are connected through top of rack switches (ToR switches). The ToR switches serve as edge access switches and are interconnected to aggregation switches (Leaf switches) to form a PoD (Point of Delivery) cluster (which is referred to as a service cluster in embodiments of the present invention). In the PoD cluster, to improve link reliability, the edge switches and the aggregation switches may be fully interconnected in a cross mode. Three-layer backbone switches (for example, Spine switches) are configured to provide an external access function, and provide interconnection between PoD clusters. Each backbone switch is connected to at least one aggregation switch. In the foregoing conventional data center, each-layer switch includes energy-consuming optical-to-electrical (O-E) and electrical-to-optical (E-O) transceivers. Consequently, there are problems such as high energy consumption, high construction costs, a long E2E packet transmission delay, and constraints on a switch port bandwidth by an electrical signal processing capability. In addition, types of traffic generated in the data center are increasingly complex, and traffic management can also improve efficiency of the data center.

An optical cross-connect (Optical Cross-Connect, OXC) is a device used for a fiber network node, and can flexibly and effectively manage an optical transmission network by performing cross-connect on optical signals. The OxC device does not need optical-electrical conversion during signal transmission. Therefore, the OxC device features low costs, a zero-forwarding delay, and a theoretically infinite link bandwidth. In an existing large-scale data center network, the OxC device is mainly used for DCI (Data Center Interconnect) to interconnect data centers in different regions.

In embodiments of the present invention, a hybrid DCN of a conventional packet switching device (for example, an electrical switch) and an optical cross-connect device is used for networking. A source routing technology is used to implement routing of a data flow in the data center. Specifically, a server in the data center routes the data flow by using the source routing technology, and more specifically, a smart network interface card in the server may dynamically identify and distinguish different types of traffic in a physical network. The smart network interface card schedules classified data flows to the electrical switch or the optical cross-connect device for forwarding by using the source routing technology, so as to flexibly use advantages of electrical switching and optical cross-connect. Therefore, network construction costs of a DCN network are reduced, and an impact of a large data flow such as an elephant flow on network congestion and network fairness is greatly reduced.

Figure 2:
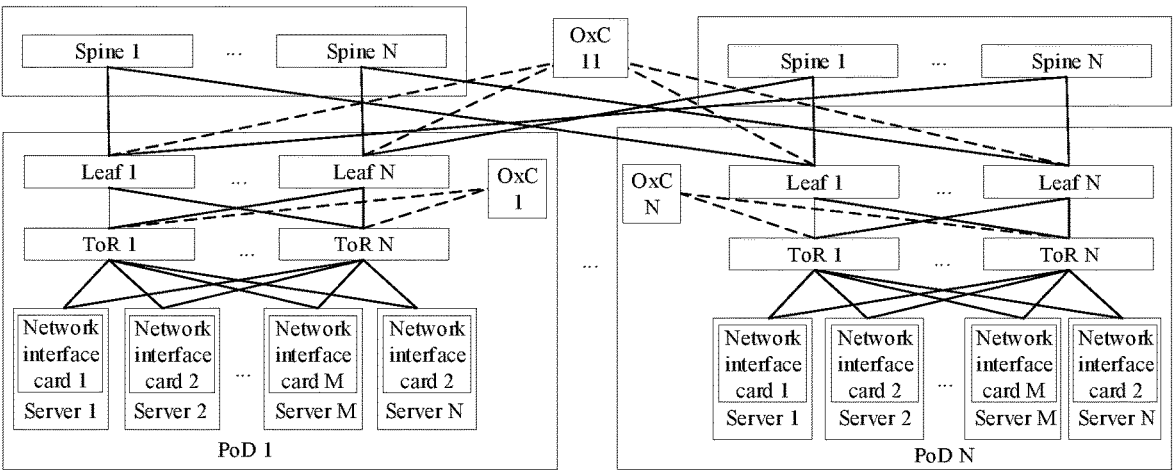
FIG. 2 is a diagram of a data center network architecture according to an embodiment of the present invention.

FIG. 2 shows a DCN networking topology architecture according to an embodiment of the present invention. At Spine and Leaf switch layers in a fat-tree network, in addition to a conventional switching device, at least one optical cross-connect device OxC is deployed, and an uplink port of a Leaf switch and/or a ToR switch is interconnected to an optical cross-connect port of the OxC device. As shown in FIG. 2, an optical cross-connect device OXC 1 is further deployed at a Leaf layer in PoD 1, and uplink ports of ToR 1 to ToR n in the PoD 1 are separately connected to an optical cross-connect port of the OXC 1. By analogy, an optical cross-connect device OXC n is also deployed at a Leaf layer in PoD n, and uplink ports of ToR 1 to ToR n in the PoD n are separately connected to an optical cross-connect port of the OXC n. A quantity of optical cross-connect devices OXCs deployed inside the PoDs and a connection mode shown in FIG. 2 are merely an implementable embodiment. More optical cross-connect devices OXCs may be further deployed inside each PoD. A ToR switch inside each PoD may be connected to an optical cross-connect device OXC inside the PoD in a full interconnection mode, or in another partial connection mode. Details are not described in this embodiment. In FIG. 2, an optical cross-connect device OxC 11 is further deployed outside the PoD. Uplink ports of Leaf 1 to Leaf n switches in the PoD 1 are separately connected to an optical cross-connect port of the OxC 11. By analogy, uplink ports of Leaf 1 to Leaf n switches in the PoD n are connected to the optical cross-connect port of the OxC 11. A quantity of optical cross-connect devices OXCs deployed outside the PoD and a connection mode shown in FIG. 2 are merely an implementable embodiment. More optical cross-connect devices OXCs may be further deployed outside the PoD. The Leaf switch inside the PoD may be connected to the optical cross-connect device OXC outside the PoD in a full interconnection mode, or in another partial connection mode. Details are not described in this embodiment. Dashed line connections in the figure are merely used as an example of two connection modes: a connection between an electrical switch and an optical cross-connect device, and a connection between electrical switches, and do not indicate that there is no connection relationship between the electrical switches and the optical cross-connect devices.

According to the embodiment shown in FIG. 2, for cross-ToR switch traffic between servers in the PoD, for example, data exchange between ToR 1 and ToR n in PoD 1, in addition to a conventional forwarding path of uplink ToR 1→Leaf 1→downlink ToR n, a smart network interface card may further schedule the traffic using a forwarding path of uplink ToR 1→OxC 1→downlink ToR n. For inter-PoD traffic, for example, data exchange between ToR 1 in PoD 1 and ToR 1 in PoD n, in addition to a conventional forwarding path of uplink ToR 1→uplink Leaf 1→Spine 1→downlink Leaf 1→downlink ToR 1, the smart network interface card may further schedule the traffic using a forwarding path of ToR 1→uplink Leaf 1→OxC 11→downlink Leaf 1→downlink ToR 1.

The foregoing DCN networking may further include a topology manager (not shown in the figure). The topology manager may be any one or more servers in a data center, or may be a topology management component running on any one or more servers. The topology manager may also be a software-defined network (Software-Defined Network, SDN) controller. The topology manager is configured to collect and manage a topology in an entire network, and send information of the collected topology in the entire network to a network interface card in each server. A topology of the electrical switch may be obtained through collection by using a link layer discovery protocol (Link Layer Discovery Protocol, LLDP), and then reported to the topology manager for synthesis. Port topology information of the optical cross-connect device OxC may be statically configured in the topology manager.

The foregoing DCN networking further includes an OXC controller (not shown in the figure). The OXC controller is an independent device, or may be a module in each optical cross-connect device OXC. The OXC controller is configured to manage an optical channel.

In this embodiment of the present invention, the smart network interface card in the server is improved, so that the smart network interface card has a source routing function. Specifically, a programmable network processor in the smart network interface card may be programmed, so that the smart network interface card can implement the source routing function. The source routing function may include functions such as discovery of network connection information, identification of a network topology data flow, and routing of a data flow in this embodiment of the present invention. In this embodiment of the present invention, at least one server may be selected from each PoD in the data center for configuration, so that the selected server has a source routing function, or a smart network interface card in each server in the data center may be selected for configuration, so as to implement a distributed source routing technology. In this embodiment of the present invention, a smart network interface card in a server is used as an example for description. During specific implementation, another device on the server may alternatively perform the foregoing function performed by the improved smart network interface card.

In the SDN network, after collecting the topology in the entire network, an SDN controller centrally calculates global routes and delivers a flow forwarding table to an electrical switch. In this embodiment of the present invention, the smart network interface card in the server is used to implement source routing control, and centralized route calculation is distributed to the smart network interface card in the server for independent calculation. This avoids problems of difficulty in controller fault tolerance caused by the centralized route calculation on the SDN controller, and rerouting and slow routing convergence after a network failure.

In this embodiment of the present invention, the smart network interface card in the server in the data center may obtain network topology information in the entire network from the topology manager. The smart network interface card may further identify different types of network traffic based on collected traffic features (for example, a quantity of packets sent per unit time, an amount of data carried in the packets, or a total bandwidth occupied by the packets) of each sent data flow, and use different routing policies of splitting (for a regular elephant flow) or bypassing (for a tidal elephant flow). In an actual data center network, only 10% of traffic may cause network congestion, but the amount of traffic accounts for 90% of the total traffic. This type of traffic is referred to as an elephant flow (Elephant Flow), and remaining traffic is referred to as a mice flow (Mice Flow). Currently, there is an increasingly growth of Internet applications. Different applications need different network capabilities for matching depending on characteristics of the applications. In many applications, applications such as a video, an intelligent AI service, and a game service account for more than 70% of Internet traffic, and will account for an increasing proportion in the future. These types of service also generate a traffic peak periodically or in a regular time period. For example, people are accustomed to performing these types of service in a specific time period, and therefore a data flow having heavy traffic occurs periodically. In this way, in this embodiment of the present invention, this type of data flow is referred to as a tidal elephant flow, and another data flow having heavy traffic occurring aperiodically or irregularly is referred to as a regular elephant flow. In this embodiment, the tidal elephant flow and the regular elephant flow are used as examples to describe differentiation between elephant flows generated by the server. In an actual service, another classification standard or classification result may also be used. In this embodiment of the present invention, a source routing control plane on the smart network interface card may dynamically plan, based on a data traffic type and/or network topology dynamic information, a routing policy for a packet to arrive at a destination node. The smart network interface card may generate a source routing forwarding label stack based on different routing policies, and distribute elephant flows of different types to the electrical switch or the optical cross-connect device. For example, an optical channel is directly used to forward the tidal elephant flow to reduce a large amount of optical-electrical conversion caused by forwarding of heavy traffic using the electrical switch. Therefore, forwarding efficiency of the tidal elephant flow may be improved and energy consumption of the data center may be reduced. In addition, in a time period when the tidal elephant flow occurs, an impact of the tidal elephant flow on other traffic in the data center may also be reduced. For another example, for the regular elephant flow, in this embodiment of the present invention, a split forwarding mode may be used, so that the forwarding efficiency for the elephant flow may be improved. In addition, on a conventional OxC device, the optical channel is manually and statically configured, and may not be flexibly configured based on a dynamic change of the data flow. In this embodiment of the present invention, the smart network interface card identifies the type or change of the data flow, and drives an optical channel controller to dynamically configure the OxC device to dynamically establish the optical channel. The tidal elephant flow may be scheduled to the optical channel of the OxC device as required, thereby reducing the impact of the tidal elephant flow on other traffic in the network.

Figure 3:
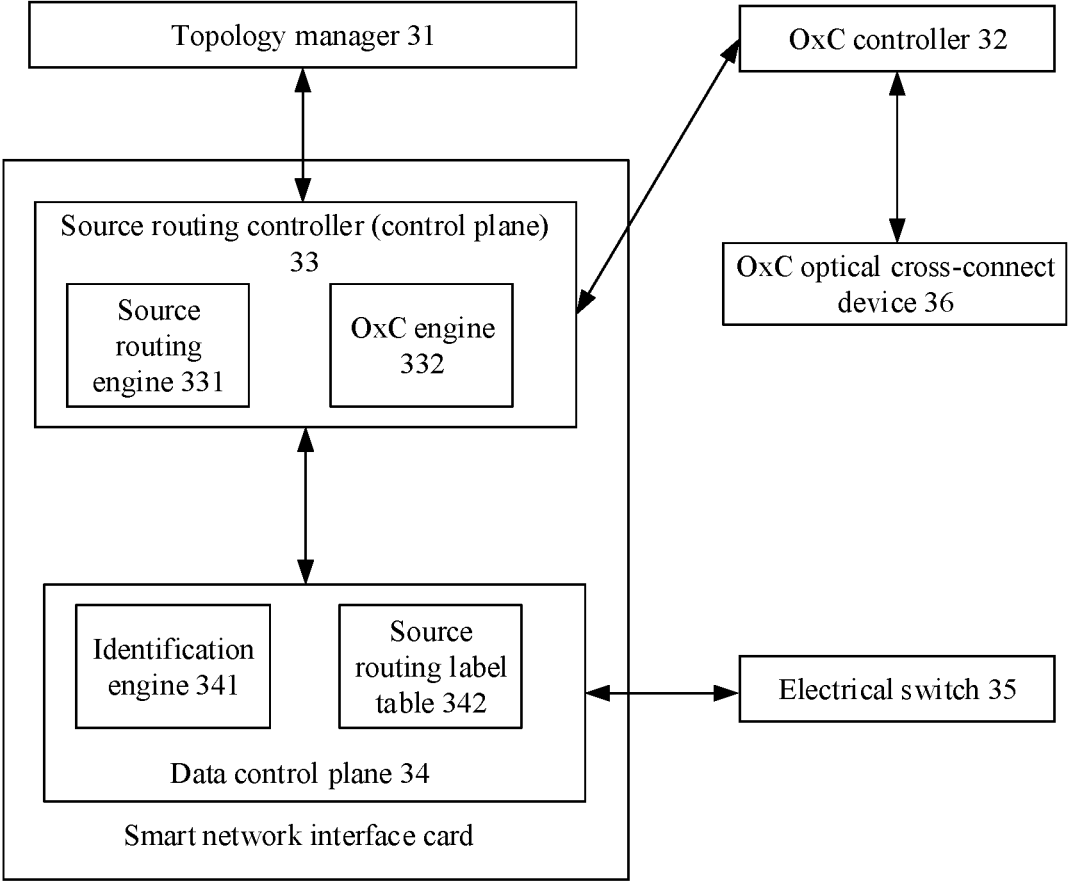
FIG. 3 is a diagram of system networking according to an embodiment of the present invention.

As shown in FIG. 3, managing and scheduling such a hybrid optical-electrical data center network needs adaptation on two planes: a data plane and a control plane. The control plane includes a topology manager and an OxC controller, and the data plane includes a smart network interface card in a server, an electrical switch such as a ToR/Leaf/Spine switch, and an optical cross-connect device OxC.

A topology manager 31 is responsible for collecting network connection information of all nodes from a smart network interface card running a link layer discovery protocol (Link Layer Discovery Protocol, LLDP) agent and from electrical switches at all layers, synthesizing the network connection information into network topology information in the entire network, and delivering synthesized network topology information in the entire network to the server through a control network. Preferably, the smart network interface card may be smart network interface cards in all servers in the entire network.

An OxC controller 32 is responsible for receiving a request, for establishing an optical channel, that is sent from a smart network interface card control plane on the server, and delivering the request to an optical cross-connect device 36 to establish an optical channel from an OxC source port to an OxC destination port.

A smart network interface card control plane 33 includes a source routing controller, configured to calculate, based on the network topology information delivered by the topology manager, a routing policy (a forwarding path) from a local server node to another server node in the entire network. A source routing engine 331 calculates a primary path and a plurality of optional backup paths that pass through the electrical switch. An OxC engine 332 calculates an optical channel that passes through the optical cross-connect device OxC, and this may also be referred to as a fast forwarding path. After receiving packets of a data flow, the source routing controller determines, in response to a data forwarding request submitted from a smart network interface card data plane, a forwarding path for the data flow based on a routing policy and a routing algorithm, generates a forwarding label stack, and delivers the forwarding label stack to the data plane. Specifically, a different forwarding path may be generated based on a type of the data flow.

A smart network interface card data plane 34 includes an identification engine 341, configured to: identify, based on feature information carried in packets of sent traffic of each data flow (determined by a 5-tuple or a 7-tuple) or a statistical feature of the packets, a tidal elephant flow or a regular elephant flow, and submit the tidal elephant flow or the regular elephant flow to the smart network interface card control plane to request to use a regular path or the fast forwarding path for forwarding. After receiving the source routing label stack delivered by the control plane, the smart network interface card data plane adds label stacks to the packets one by one based on label stack information of different data flows, and then sends the packets, and stores source routing label information in a source routing label table 342.

An electrical switch 35 is an electrical switch supporting a source routing label stack, parses label stacks (where the label stacks include an egress port number of a per-hop electrical switch on a forwarding path) in packet headers one by one, and directly forwards the packets through the egress port after obtaining information about the egress port corresponding to a current-hop switch from the label stacks through parsing, regardless of whether a next hop is to the electrical switch or to the optical cross-connect device.

The following table lists information about several forwarding paths.

| Networking path in a three-Layer networking architecture | Routing policy | Source routing label | Applicable scenario |
|---|---|---|---|
| Path 1 | Forwarding by an electrical switch in a server cabinet | 1-level stacking | Virtual machine/ container/cloud storage |
| Path 2 | Hybrid optical-electrical forwarding in a | 2-level stacking | Virtual machine migration in the PoD |

-continued

| Networking path in a three-Layer networking architecture | Routing policy | Source routing label | Applicable scenario |
|---|---|---|---|
| Path 3 | PoD Electrical forwarding in a PoD | 3-level stacking | Virtual machine/ container/cloud storage |
| Path 4 | Hybrid optical- electrical forwarding between PoDs | 4-level stacking | Virtual machine migration between the PoDs |
| Path 5 | Electrical forwarding between PoDs | 5-level stacking | Virtual machine/ container/cloud storage |

Figure 4:
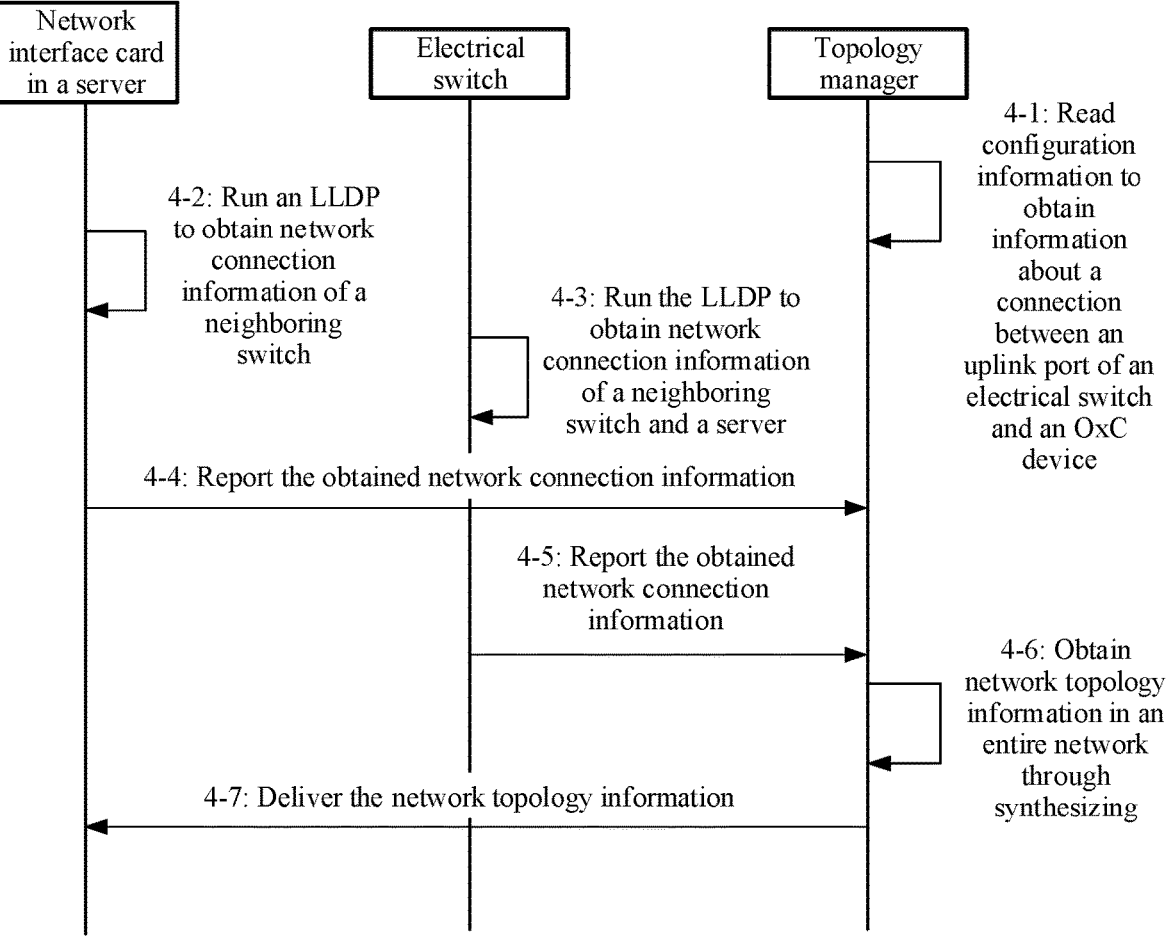
FIG. 4 is a flowchart of a topology management method according to an embodiment of the present invention.

FIG. 4 shows a flowchart of a method for topology discovery in hybrid DCN networking according to an embodiment of the present invention. The method includes the following steps:

4-1: A topology manager obtains a static topology configuration file, where the static topology configuration file includes information about a network connection between an electrical switch and an optical cross-connect device OxC in a data center. Specifically, the topology manager may obtain connection relationships between all electrical switches and all optical cross-connect devices OxCs in the data center, for example, an uplink port of PoD 1-ToR 1→PoD 1-OxC 1, an uplink port of PoD n-ToR 1→PoD n-OxC 1, an uplink port of PoD 1-Leaf 1→OxC 11, and an uplink port of PoD n-Leaf 1→OxC 11.

4-2: A smart network interface card in a server runs an LLDP agent (agent) to obtain network connection information (for example, a port sequence number, an IP address, or a MAC address) of a neighboring node. The neighboring node may be a neighboring switch. Specifically, smart network interface cards in all servers in the data center may run the LLDP agent to collect the network connection information of the neighboring node, or smart network interface cards in some servers may run the LLDP agent to collect the network connection information of the neighboring node. FIG. 4 shows only one of the implementations.

4-3: The electrical switch runs the LLDP agent (agent) to obtain network connection information (for example, a port sequence number, an IP address, or a MAC address) of a neighboring node by using an LLDP protocol. The neighboring node may be a neighboring switch or a neighboring server. Specifically, all electrical switches in the data center may run the LLDP agent to collect the network connection information of the neighboring node, or some switches may run the LLDP agent to collect the network connection information of the neighboring node (for example, an inactive electrical switch may not join the network). FIG. 4 shows only one of the implementations.

4-4: The smart network interface card in the server reports the collected network connection information of the neighboring node to the topology manager. Specifically, the smart network interface cards in all the servers in the data center may periodically report, to the topology manager, the network connection information of the neighboring node collected by the smart network interface cards. In addition, each smart network interface card may report network connection information of the smart network interface card to the topology manager.

4-5: The electrical switch reports the collected network connection information of the neighboring node. Specifically, all the electrical switches in the data center may periodically report, to the topology manager, the network connection information of the neighboring node collected by the electrical switches. In addition, each electrical switch may further report network connection information of the electrical switch to the topology manager.

4-6: The topology manager obtains, through synthesizing based on information collected by each node, network topology information that includes all smart network interface cards, electrical switches, and optical cross-connect devices OxCs in the entire network.

4-7: The topology manager delivers the network topology information in the entire network to at least one smart network interface card in the data center. Specifically, one smart network interface card inside each server is responsible for identifying a data flow inside the server and forwarding the data flow. Therefore, the topology manager delivers the network topology information in the entire network to at least one smart network interface card inside each server.

The electrical switch or the smart network interface card running the LLDP agent may periodically exchange heartbeats, and refresh the network connection information of the neighboring node. When network connection information of each node in the data center changes, the network topology information in the entire network also changes. Therefore, the topology manager also re-delivers refreshed network topology information periodically or based on a request of the smart network interface card in the server.

In an SDN network, after collecting the network topology information in the entire network, an SDN controller centrally calculates global routes and delivers a flow forwarding table to each electrical switch. In this embodiment, the topology manager delivers the network topology information to each server, and distributes centralized route calculation to the server for independent calculation. This avoids problems of difficulty in controller fault tolerance caused by the centralized route calculation on the SDN controller, and rerouting and slow routing convergence after a network failure.

Figure 5:
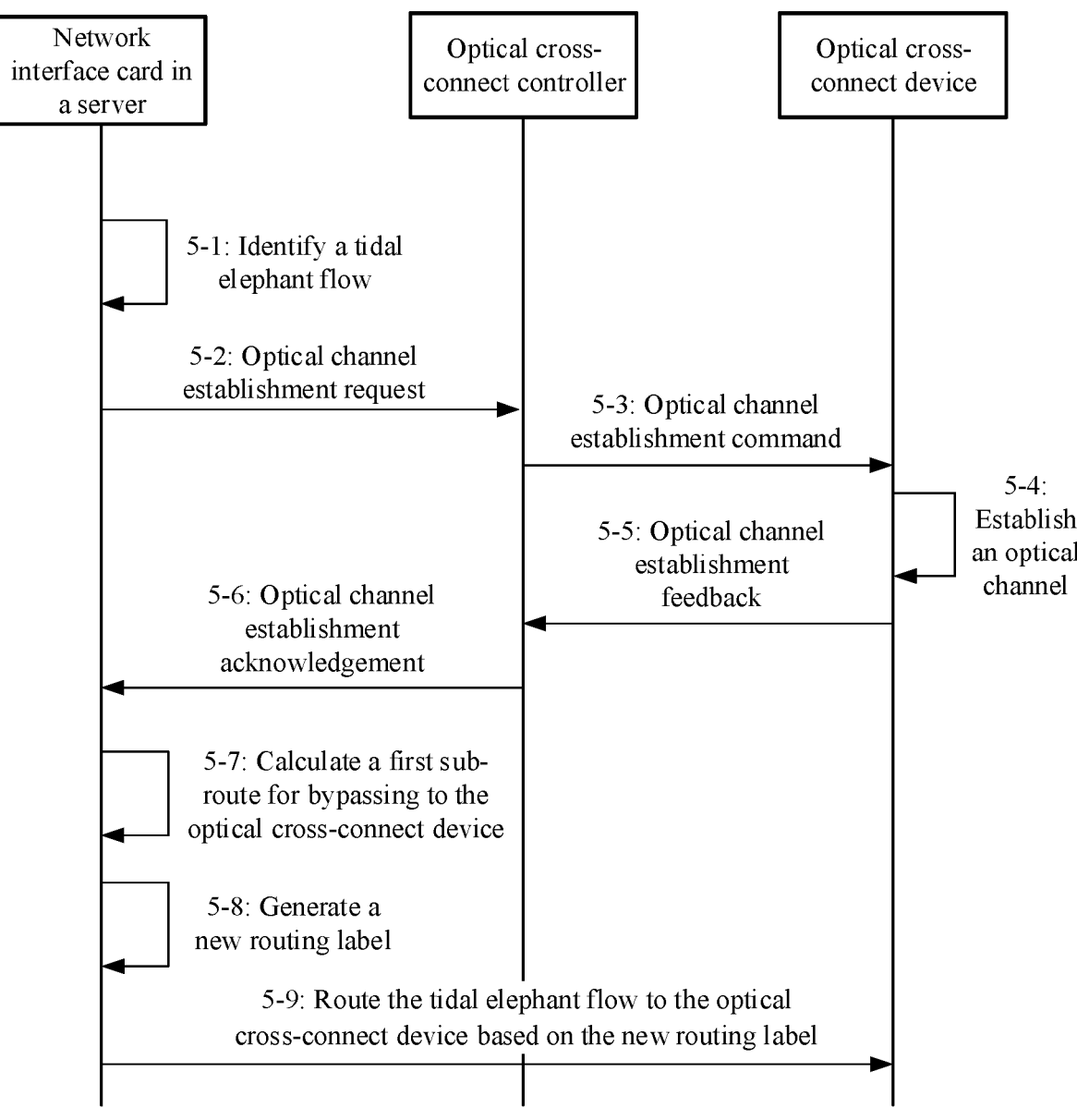
FIG. 5 is a flowchart of optical channel establishment and packet forwarding according to an embodiment of the present invention.

FIG. 5 shows a flowchart of sending network packet traffic in a data center using a hybrid optical-electrical architecture according to an embodiment of the present invention. The method includes the following steps.

5-1: A server generates packets of a data flow, where the packets arrive at a local smart network interface card, and the smart network interface card in the server identifies a type of the data flow generated by the server.

The smart network interface card may identify feature information carried in the packets of the data flow; and if the feature information of the packets matches preset information, determine that the data flow is a tidal elephant flow. The smart network interface card may identify a quantity of packets of the data flow in a first time period, or an amount of data included in packets in a first time period, or a bandwidth required by packets in a first time period; and if the quantity of packets, the amount of data, or the required bandwidth in the first time period is greater than a preset threshold, determine that the data flow is a regular elephant flow. The smart network interface card may collect statistics on traffic through periodic sampling. For example, the traffic is determined through a payload size of data packets of the data flow. Data packets having a size greater than a preset threshold are identified as an elephant flow. Alternatively, the smart network interface card may further calculate average traffic of the data flow in a specific time period, and identify the data flow as an elephant flow when the calculated average traffic is greater than a preset threshold. Further, whether the elephant flow is a regular elephant flow or a tidal elephant flow is determined based on preset information. Any one of the foregoing traffic identification methods may be selected, or any combination of the methods may be used to obtain a more accurate identification result. The smart network interface card may alternatively have a built-in artificial intelligent AI algorithm model. The AI algorithm model is trained by using data packet traffic, and a trained AI algorithm model is used to identify and classify the data packet traffic. The smart network interface card may identify the data packet traffic in real time or non-real time.

5-2: After identifying that the data packets are a tidal elephant flow, the smart network interface card determines to forward the tidal elephant flow through an optical channel. A source routing controller on the smart network interface card may select, based on network topology information, a target optical cross-connect device from optical cross-connect devices in the data center, and send, through a control network, an OxC optical channel establishment request to an optical cross-connect controller corresponding to the target optical cross-connect device.

Specifically, the smart network interface card may select a target optical cross-connect device OxC or a plurality of target optical cross-connect devices OxCs based on the network topology information. If a rule for selecting the optical cross-connect device OxC may be a principle of transmit end proximity, an optical cross-connect device OxC closest to a transmit end server is selected, or an optical cross-connect device OxC closest to a ToR or Leaf switch connected to a transmit end server is selected, or an optical cross-connect device OxC closest to a destination server is selected, or an optical cross-connect device OxC closest to a ToR or Leaf switch connected to a destination end server is selected.

5-3: The optical cross-connect controller sends a control command to the target optical cross-connect device, to indicate the target optical cross-connect device to establish a corresponding optical channel.

5-4: The target optical cross-connect device establishes the corresponding optical channel.

5-5: After establishing the optical channel, the target optical cross-connect device feeds back the establishment to the optical cross-connect controller.

5-6: The optical cross-connect controller feeds back a response indicating that the establishment of the optical channel is successful to the source routing controller on the smart network interface card.

5-7: The source routing controller on the smart network interface card calculates, based on the network topology information, a first sub-route for bypassing the tidal elephant flow from the electrical switch to the OxC optical channel, and obtains information about the first sub-route.

5-8: The source routing controller on the smart network interface card generates a new source routing label based on the information about the first sub-route, and delivers the new source routing label to a flow forwarding table, in a smart network interface card data plane, that corresponds to the tidal elephant flow.

5-9: The smart network interface card labels subsequent packets of the tidal elephant flow based on the new source routing label and forwards the packets.

Specifically, the subsequent packets of the tidal elephant flow may be forwarded to the target optical cross-connect device based on a new source routing label stack.

On a conventional OxC device, the optical channel is manually and statically configured, and may not be flexibly configured based on a dynamic change of data traffic. In this embodiment of the present invention, the smart network interface card identifies the change of network traffic, drives an optical channel controller to dynamically configure the OxC device to dynamically establish the optical channel, and may schedule a periodic elephant flow or a tidal elephant flow to an OxC channel as required. Therefore, an impact of these types of elephant flows on remaining traffic in a network is reduced, and forwarding efficiency of these types of elephant flows is improved. In addition, optical-electrical conversion operations for a large quantity of data flows are avoided, thereby reducing energy consumption in the data center and costs.

Figure 6:
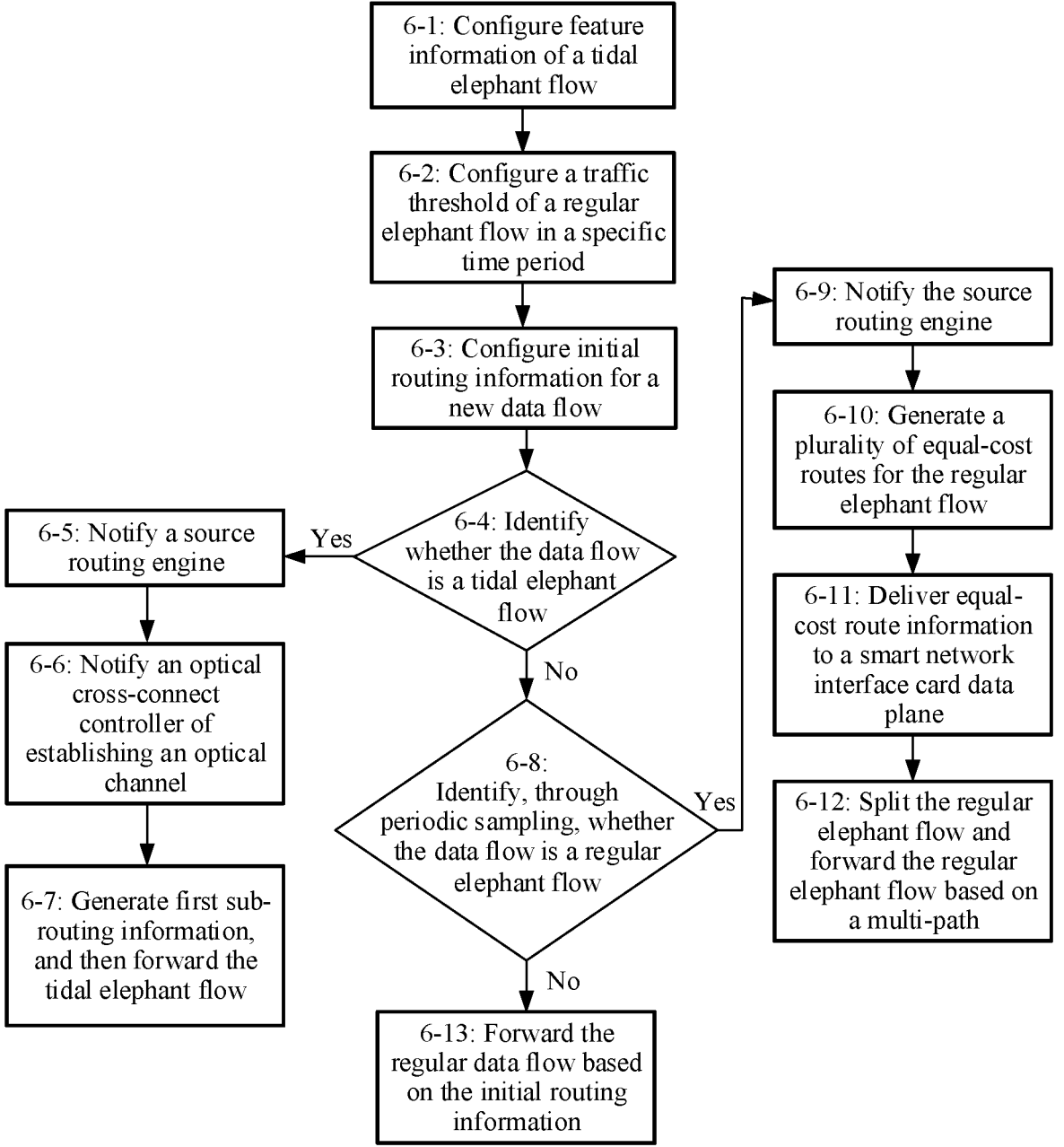
FIG. 6 is a flowchart of a method for communication in a data center according to an embodiment of the present invention.

FIG. 6 is a flowchart of another method for forwarding a data flow by using a hybrid optical-electrical data center according to an embodiment of the present invention.

In this embodiment of the present invention, one of implementations for identifying a type of a data flow and forwarding the data flow by a smart network interface card is shown in FIG. 6. The implementation includes the following steps.

6-1: Configure a value range of a differentiated services code point (Differentiated Services Code Point, DSCP) of a tidal elephant flow on a smart network interface card or on a server.

According to a DiffServ system, transmission packets are each classified into different types in a network. In a network that complies with the DiffServ system, switches and routers apply a same transmission service policy to packets having same classification information and apply different transmission service policies to packets having different classification information. The classification information of the packets may be assigned by a host, a switch, a router, or another network device in the network. Identifying content of packets to assign category information to the packets needs to consume a large quantity of processing resources from a network device. In this embodiment of the present invention, DSCP identification is applied to the server, and specifically, applied to the smart network interface card in the server, so as to avoid a large quantity of processing overheads of network resources, such as a switch, being occupied. For data packets output or received by the server, different category information may be assigned to the packets based on different application policies or different packet content. Different DSCP values of the data packets indicate different types of the data packets.

Different DSCP values (referred to as feature information of the packets in the present invention) represent different types of packets. The DSCP values may be indicated in different modes. The DSCP value of the data packet may be included in an IP packet header. For example, a type of service (Type Of Service, TOS) in the IP packet header is used to carry the DSCP value (classification information) of the packet, or the DSCP value of the packet is determined by including User Priority bits in a layer 2 packet header of the packet. For another example, a source MAC address, a destination MAC addresses, and an Ethertype field of the packet are extracted to match associated access control lists (Access Control Lists, ACLs), so as to determine the DSCP value of the packet. For another example, the DSCP value of the packet is obtained based on a default CoS value of a packet input port.

6-2: Configure, on the smart network interface card or a memory inside the server, a preset threshold of a quantity of packets of in a unit time, an amount of data carried in the packets, or a bandwidth occupied by the packets of a regular elephant flow.

6-3: For each received data flow, when a first data packet of the data flow is received, generate initial routing information based on address information carried in the packet, for example, destination address information or source address information, where the initial routing information includes an initial forwarding path or an initial routing label.

There is no regular sequence of performing the two steps above, and the two steps may be performed simultaneously or separately.

6-4: Continue to receive packets of a first data flow, obtain DSCP values carried in the received packets, and determine, based on the DSCP values carried in the packets, whether the first data flow is a tidal elephant flow.

6-5: For the first data flow that is determined as the tidal elephant flow, notify a source routing engine in the smart network interface card.

6-6: The source routing engine notifies an OxC engine, and the OxC engine establishes an optical channel.

6-7: The source routing engine generates a new routing label for routing the first data flow to the optical channel.

6-8: Continue to receive a second data flow, and obtain a quantity of data packets or packet traffic (an amount of data carried in the packets or a bandwidth occupied by the packets) of the second data flow in a unit time through periodic sampling.

6-9: For the second data flow that is determined as a regular elephant flow, notify the source routing engine in the smart network interface card.

6-10: The source routing engine generates a plurality of equal-cost forwarding paths for the regular elephant flow, and generates corresponding routing labels. The source routing engine may generate the plurality of equal-cost forwarding paths based on initial routing information previously generated for the second data flow.

6-11: The source routing engine delivers, to a smart network interface card data plane, routing labels of the plurality of equal-cost forwarding paths that are generated for the second data flow.

6-12: The smart network interface card data plane splits subsequent packets of the second data flow into at least two sub-data flows, and forwards the two sub-data flows based on routing information of the at least two equal-cost paths.

6-13: For a third data flow that is determined as a regular data flow, continue to forward subsequent packets of the third data flow based on initial routing information of the third data flow.

Figure 7:
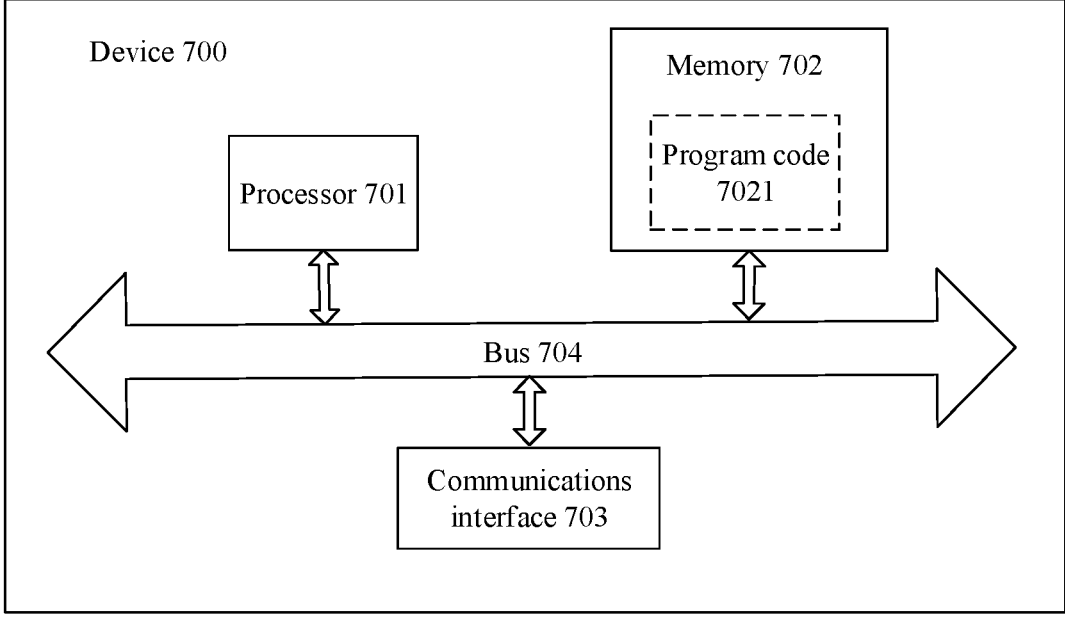
FIG. 7 is a schematic diagram of composition of a device according to an embodiment of the present invention.

FIG. 7 is a schematic diagram of a device 700 according to an embodiment of the present invention. As shown in the figure, the device 700 includes a processor 701, a memory 702, a communications interface 703, and a bus 704. The processor 701, the memory 702, and the communications interface 703 communicate with each other through the bus 704, or may communicate with each other in another means such as wireless transmission. The memory 702 is configured to store program code 7021, and the processor 701 is configured to invoke the program code 7021 stored in the memory 702, to perform operations of the methods described in embodiments of this application.

The processor 701 may perform operations related to the methods in embodiments of the present invention.

It should be understood that in embodiments of the present invention, the processor 701 may be a CPU, or the processor 701 may be another general-purpose processor, a digital signal processor (DSP), an application-specific integrated circuit (ASIC), a field programmable gate array (FPGA), a GPU, a network processor or another programmable logic device, a discrete gate or transistor logic device, a discrete hardware component, or the like. The general-purpose processor may be a microprocessor or any conventional processor or the like.

The memory 702 may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example, and not limitation, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The bus 704 may further include a power bus, a control bus, a status signal bus, and the like, in addition to a data bus. However, for clear description, various types of buses in the figure are denoted as the bus 704.

Finally, it should be understood that the foregoing embodiments are merely used for explanation, and the technical solutions of this application are not limited thereto. It should be understood that a person skilled in the art may make various modifications, changes, or replacements without departing from the scope of the claims of this application.

What is claimed is:

1. A method for communication in a data center, wherein the data center comprises a plurality of servers, a plurality of electrical switches, and at least one optical cross-connect device, and uplink ports of at least two of the plurality of electrical switches are interconnected to the at least one optical cross-connect device, and wherein the method comprises:

receiving network topology information delivered by a topology manager;

obtaining a data flow; and configuring a routing policy for the data flow based on the network topology information, wherein;

the configuring a routing policy for the data flow based on the network topology information comprises:

identifying feature information carried in packets of the data flow; and if the feature information of the packets matches preset information, determining that the data flow is a tidal elephant flow; or identifying a quantity of packets of the data flow in a first time period, or an amount of data comprised in packets in a first time period, or a bandwidth required by packets in a first time period; and if the quantity of packets, the amount of data, or the required bandwidth in the first time period is greater than a preset threshold, determining that the data flow is a regular elephant flow; and the routing policy comprises any one or a combination of the following routing policies:

a first routing policy, wherein the first routing policy indicates to forward the tidal elephant flow through an optical channel in the at least one optical cross-connect device;

a second routing policy, wherein the second routing policy indicates to split the regular elephant flow into at least two sub-data flows for forwarding; and a third routing policy, wherein the third routing policy indicates to forward the data flow through an electrical switch of the plurality of electrical switches in the data center.

2. The method according to claim 1, wherein the configuring a routing policy for the data flow based on the network topology information comprises:

when a first packet of the data flow is received, configuring the third routing policy for the data flow based on address information carried in the data flow and the network topology information.

3. The method according to claim 2, wherein the configuring a routing policy for the data flow based on the network topology information further comprises:

identifying a type of the data flow based on the packets of the data flow; and configuring an updated routing policy for the data flow based on the type of the data flow, wherein the updated routing policy comprises the first routing policy or the second routing policy.

4. The method according to claim 3, wherein the configuring an updated routing policy for the data flow based on the type of the data flow comprises:

configuring the first routing policy for a data flow of a first type, wherein the data flow of the first type is the tidal elephant flow.

5. The method according to claim 4, wherein the method further comprises:

selecting a target optical cross-connect device from the at least one optical cross-connect device;

indicating the target optical cross-connect device to establish the optical channel;

obtaining first sub-routing information, wherein the first sub-routing information comprises information on routing the data flow of the first type to the target optical cross-connect device; and forwarding subsequent packets of the data flow of the first type to the target optical cross-connect device based on the first sub-routing information.

6. The method according to claim 3, wherein the configuring an updated routing policy for the data flow based on the type of the data flow comprises:

configuring the second routing policy for a data flow of a second type, wherein the data flow of the second type is the regular elephant flow.

7. The method according to claim 6, wherein the method further comprises:

obtaining routing information of at least two equal-cost sub-paths based on the second routing policy;

splitting subsequent packets of the data flow of the second type into at least two sub-data flows; and forwarding the at least two sub-data flows based on the routing information of the at least two equal-cost sub-paths.

8. A data center, wherein the data center comprises a plurality of servers, a plurality of electrical switches, and at least one optical cross-connect device, and uplink ports of at least two of the plurality of electrical switches are interconnected to the at least one optical cross-connect device, and wherein at least one of the plurality of servers is configured to:

receive network topology information;

obtain a data flow; and configure a routing policy for the data flow based on the network topology information, wherein:

the configuring a routing policy for the data flow based on the network topology information comprises:

identifying feature information carried in packets of the data flow; and if the feature information of the packets matches preset information, determining that the data flow is a tidal elephant flow; or identifying a quantity of packets of the data flow in a first time period, or an amount of data comprised in packets in a first time period, or a bandwidth required by packets in a first time period; and if the quantity of packets, the amount of data, or the required bandwidth in the first time period is greater than a preset threshold, determining that the data flow is a regular elephant flow; and the routing policy comprises any one or a combination of the following routing policies:

a first routing policy, wherein the first routing policy indicates to forward the tidal elephant flow through an optical channel in the at least one optical cross-connect device;

a second routing policy, wherein the second routing policy indicates to split the regular elephant flow into at least two sub-data flows for forwarding; and a third routing policy, wherein the third routing policy indicates to forward the data flow through an electrical switch of the plurality of electrical switches in the data center.

9. The data center according to claim 8, wherein the plurality of servers and the plurality of electrical switches form a plurality of service clusters, wherein a first service cluster comprises at least two servers, at least two access switches, and at least one aggregation switch, first uplink ports of the at least two access switches are interconnected to the at least one optical cross-connect device, and second uplink ports of the at least two access switches are interconnected to the at least one aggregation switch.

10. The data center according to claim 8, wherein the plurality of servers and the plurality of electrical switches form a plurality of service clusters, wherein a first service cluster comprises at least two access switches and at least one aggregation switch, a first uplink port of the at least one aggregation switch is interconnected to the at least one optical cross-connect device, and a second uplink port of the at least one aggregation switch is interconnected to a backbone switch.

11. The data center according to claim 8, wherein the plurality of servers and the plurality of electrical switches form a plurality of service clusters, wherein a first service cluster comprises at least two servers, at least two access switches, and at least one aggregation switch, first uplink ports of the at least two access switches are interconnected to a first optical cross-connect device in the at least one optical cross-connect device, second uplink ports of the at least two access switches are interconnected to the at least one aggregation switch, a first uplink port of the at least one aggregation switch is interconnected to a second optical cross-connect device in the at least one optical cross-connect device, and a second uplink port of the at least one aggregation switch is interconnected to a backbone switch.

12. The data center according to claim 8, wherein the data center further comprises a topology manager, and the topology manager is configured to:

obtain network connection information sent by each device in the data center;

obtain the network topology information based on the network connection information of the device; and deliver the network topology information to the at least one of the plurality of servers.

13. The data center according to claim 12, wherein the at least one server comprises a network interface card, wherein the network interface card obtains the network topology information delivered by the topology manager, and the network interface card configures the routing policy based on the network topology information.

14. The data center according to claim 13, wherein in response to receiving a first packet of the data flow, the network interface card configures the third routing policy for the data flow based on address information carried in the data flow and the network topology information.

15. The data center according to claim 14, wherein the network interface card identifies a type of the data flow based on the packets of the data flow, and configures an updated routing policy for the data flow based on the type of the data flow, wherein the updated routing policy comprises the first routing policy or the second routing policy.

16. The data center according to claim 15, wherein the network interface card configures the first routing policy for a data flow of a first type, wherein the data flow of the first type is the tidal elephant flow, or configures the second routing policy for a data flow of a second type, wherein the data flow of the second type is the regular elephant flow.

17. The data center according to claim 16, wherein the network interface card is further configured to:

select a target optical cross-connect device from the at least one optical cross-connect device;

indicate the target optical cross-connect device to establish the optical channel;

obtain first sub-routing information, wherein the first sub-routing information comprises information on routing the data flow of the first type to the target optical cross-connect device; and forward subsequent packets of the data flow of the first type to the target optical cross-connect device based on the first sub-routing information.

18. The data center according to claim 16, wherein the network interface card is further configured to obtain routing information of at least two equal-cost sub-paths based on the third routing policy, and wherein the network interface card is further configured to:

split subsequent packets of the data flow of the second type into at least two sub-data flows; and forward the at least two sub-data flows based on the routing information of the at least two equal-cost sub-paths.

19. A server of a data center, wherein the server comprises:

at least one processor; and one or more memories coupled to the at least one processor and storing programming instructions for execution by the at least one processor to perform operations comprising:

receiving network topology information delivered by a topology manager;

obtaining a data flow; and configuring a routing policy for the data flow based on the network topology information, wherein;

the configuring a routing policy for the data flow based on the network topology information comprises:

identifying feature information carried in packets of the data flow; and if the feature information of the packets matches preset information, determining that the data flow is a tidal elephant flow; or identifying a quantity of packets of the data flow in a first time period, or an amount of data comprised in packets in a first time period, or a bandwidth required by packets in a first time period; and if the quantity of packets, the amount of data, or the required bandwidth in the first time period is greater than a preset threshold, determining that the data flow is a regular elephant flow; and the routing policy comprises any one or a combination of the following routing policies:

a first routing policy, wherein the first routing policy indicates to forward the tidal elephant flow through an optical channel in at least one optical cross-connect device in the data center;

a second routing policy, wherein the second routing policy indicates to split the regular elephant flow into at least two sub-data flows for forwarding; and a third routing policy, wherein the third routing policy indicates to forward the data flow through an electrical switch of a plurality of electrical switches in the data center, wherein uplink ports of the electrical switches is interconnected to the at least one optical cross-connect device.

20. A network interface card, wherein the network interface card comprises:

at least one processor; and one or more memories coupled to the at least one processor and storing programming instructions for execution by the at least one processor to perform operations comprising:

receiving network topology information delivered by a topology manager;

obtaining a data flow; and configuring a routing policy for the data flow based on the network topology information, wherein:

the configuring a routing policy for the data flow based on the network topology information comprises:

identifying feature information carried in packets of the data flow; and if the feature information of the packets matches preset information, determining that the data flow is a tidal elephant flow; or identifying a quantity of packets of the data flow in a first time period, or an amount of data comprised in packets in a first time period, or a bandwidth required by packets in a first time period; and if the quantity of packets, the amount of data, or the required bandwidth in the first time period is greater than a preset threshold, determining that the data flow is a regular elephant flow; and the routing policy comprises any one or a combination of the following routing policies:

a first routing policy, wherein the first routing policy indicates to forward the tidal elephant flow through an optical channel in at least one optical cross-connect device in a data center;

a second routing policy, wherein the second routing policy indicates to split the data flow into at least two sub-data flows for forwarding; and a third routing policy, wherein the third routing policy indicates to forward the regular elephant flow through an electrical switch of a plurality of electrical switches in the data center, wherein uplink ports of the electrical switches is interconnected to the at least one optical cross-connect device.

\* \* \* \* \*